(12) United States Patent
Held et al.

(10) Patent No.: US 10,630,965 B2
(45) Date of Patent: Apr. 21, 2020

(54) CALIBRATING A NEAR-EYE DISPLAY

(71) Applicant: MICROSOFT TECHNOLOGY LICENSING, LLC, Redmond, WA (US)

(72) Inventors: Robert Thomas Held, Seattle, WA (US); Anatolie Gavriliuc, Kirkland, WA (US); Riccardo Giraldi, Seattle, WA (US); Szymon P. Stachniak, Redmond, WA (US); Andrew Frederick Muehlhausen, Seattle, WA (US); Maxime Ouellet, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 224 days.

(21) Appl. No.: 14/873,928

(22) Filed: Oct. 2, 2015

(65) Prior Publication Data
US 2017/0099481 A1   Apr. 6, 2017

(51) Int. Cl.
*G06T 17/00* (2006.01)
*H04N 13/327* (2018.01)
(Continued)

(52) U.S. Cl.
CPC ......... *H04N 13/327* (2018.05); *G02B 27/017* (2013.01); *G02B 27/0172* (2013.01);
(Continued)

(58) Field of Classification Search
CPC ........... H04N 13/0425; H04N 13/0484; H04N 13/0497; H04N 13/0203; H04N 13/044;
(Continued)

(56) References Cited

U.S. PATENT DOCUMENTS 6,095,566 A  *  8/2000  Yamamoto  .............  B42D 25/23
                                                 283/107
6,118,888 A  *  9/2000  Chino  .....................  G06F 3/011
                                                 382/118

(Continued)

FOREIGN PATENT DOCUMENTS

WO   2014006516 A1   1/2014
WO   2014156033 A1   10/2014

OTHER PUBLICATIONS

Fuhrmann, A. et al. "Fast Calibration for Augmented Reality", In Proceedings of The ACM Symposium on Virtual Reality Software and Technology (VRST '99), Available at https://www.cg.tuwien.ac.at/research/publications/1999/Fuhr-1999-Cal/TR-186-2-99-16Paper.pdf, London, United Kingdom, Dec. 20, 1999, 8 pages.

(Continued)

*Primary Examiner* — Philip P. Dang
(74) *Attorney, Agent, or Firm* — Alleman Hall Creasman & Tuttle LLP

(57) ABSTRACT

Examples are disclosed herein that relate to calibrating a user's eye for a stereoscopic display. One example provides, on a head-mounted display device including a see-through display, a method of calibrating a stereoscopic display for a user's eyes, the method including for a first eye, receiving an indication of alignment of a user-controlled object with a first eye reference object viewable via the head-mounted display device from a perspective of the first eye, determining a first ray intersecting the user-controlled object and the first eye reference object from the perspective of the first eye, and determining a position of the first eye based on the first ray. The method further includes repeating such steps for a second eye, determining a position of the second eye based on a second ray, and calibrating the stereoscopic (Continued)

display based on the position of the first eye and the position of the second eye.

20 Claims, 4 Drawing Sheets

(51) Int. Cl.
    *H04N 13/204*     (2018.01)
    *H04N 13/344*     (2018.01)
    *H04N 13/383*     (2018.01)
    *H04N 13/398*     (2018.01)
    *G02B 27/01*     (2006.01)
    *G06T 19/00*     (2011.01)

(52) U.S. Cl.
    CPC .......... *G06T 19/006* (2013.01); *H04N 13/204* (2018.05); *H04N 13/344* (2018.05); *H04N 13/383* (2018.05); *H04N 13/398* (2018.05); *G02B 2027/014* (2013.01); *G02B 2027/0134* (2013.01); *G02B 2027/0138* (2013.01); *G02B 2027/0174* (2013.01)

(58) Field of Classification Search
    CPC ......................... G06T 19/006; G02B 27/0172; G02B 27/017; G02B 2027/0138; G02B 2027/0134; G02B 2027/014; G02B 2027/0174
    See application file for complete search history.

(56) References Cited

U.S. PATENT DOCUMENTS

| | | | | |
|---|---|---|---|---|
| 6,578,962 | B1* | 6/2003 | Amir | A61B 3/113 345/157 |
| 6,753,828 | B2 | 6/2004 | Tuceryan et al. | |
| 6,880,943 | B2* | 4/2005 | Fiete | G01J 9/00 359/419 |
| 7,209,269 | B1* | 4/2007 | Sathyan | G02B 5/1876 359/15 |
| 7,605,926 | B1* | 10/2009 | Hetzler | G01M 11/0221 356/515 |
| 7,957,581 | B2* | 6/2011 | Wu | G06T 7/593 348/187 |
| 8,072,481 | B1* | 12/2011 | McNelley | H04N 7/144 348/14.01 |
| 8,284,234 | B2* | 10/2012 | Bjelkhagen | G02B 23/24 345/7 |
| 8,638,498 | B2 | 1/2014 | Bohn et al. | |
| 8,836,768 | B1* | 9/2014 | Rafii | G06F 3/017 345/420 |
| 8,970,625 | B2* | 3/2015 | Chavez | G06F 3/012 345/633 |
| 2002/0113756 | A1 | 8/2002 | Tuceryan et al. | |
| 2004/0061831 | A1 | 4/2004 | Aughey et al. | |
| 2006/0072206 | A1 | 4/2006 | Tsuyuki et al. | |
| 2010/0085276 | A1* | 4/2010 | Cable | G03H 1/2205 345/6 |
| 2011/0144505 | A1* | 6/2011 | Yamamoto | A61B 5/0064 600/476 |
| 2011/0261427 | A1* | 10/2011 | Hart | G03H 1/2249 359/22 |
| 2012/0212399 | A1 | 8/2012 | Border et al. | |
| 2012/0218301 | A1* | 8/2012 | Miller | G02B 27/017 345/633 |
| 2013/0007668 | A1 | 1/2013 | Liu et al. | |
| 2013/0050642 | A1 | 2/2013 | Lewis et al. | |
| 2013/0050833 | A1 | 2/2013 | Lewis et al. | |
| 2013/0083003 | A1* | 4/2013 | Perez | G06F 3/005 345/419 |
| 2013/0083009 | A1* | 4/2013 | Geisner | A63F 13/02 345/419 |
| 2013/0155477 | A1* | 6/2013 | Yankov | G02B 27/225 359/15 |
| 2013/0234934 | A1* | 9/2013 | Champion | G06F 3/012 345/156 |
| 2014/0033052 | A1* | 1/2014 | Kaufman | G02B 27/2271 715/733 |
| 2014/0184496 | A1 | 7/2014 | Gribetz et al. | |
| 2014/0191927 | A1 | 7/2014 | Cho | |
| 2014/0208274 | A1* | 7/2014 | Smyth | G06F 3/0304 715/863 |
| 2014/0274391 | A1 | 9/2014 | Stafford | |
| 2014/0285429 | A1* | 9/2014 | Simmons | G02B 27/225 345/156 |
| 2014/0289649 | A1* | 9/2014 | Vogelmeier | G06F 3/013 715/757 |
| 2014/0327944 | A1* | 11/2014 | Naidoo | G01N 15/0227 359/9 |
| 2014/0333665 | A1* | 11/2014 | Sylvan | G02B 27/0149 345/633 |
| 2014/0375540 | A1 | 12/2014 | Ackerman et al. | |
| 2015/0016777 | A1* | 1/2015 | Abovitz | G02B 27/225 385/37 |
| 2015/0049201 | A1* | 2/2015 | Liu | H04N 17/00 348/189 |
| 2015/0095882 | A1* | 4/2015 | Jaeger | G06F 8/34 717/109 |
| 2015/0103306 | A1 | 4/2015 | Kaji et al. | |
| 2015/0109576 | A1 | 4/2015 | Krasnow et al. | |
| 2015/0234477 | A1* | 8/2015 | Abovitz | G06F 16/7837 382/103 |
| 2015/0241963 | A1* | 8/2015 | Nortrup | G06F 3/012 345/156 |

OTHER PUBLICATIONS

ISA European Patent Office, International Search Report and Written Opinion Issued in PCT Application No. PCT/US2016/051197, dated Dec. 9, 2016, WIPO, 14 pages.

Wibirama, et al., "3D Gaze Tracking on Stereoscopic Display Using Optimized Geometric Method", In Proceedings of IEEJ Transactions on Electronics, Information and Systems, vol. 134, Issue 3, Mar. 2014, pp. 1-8.

Fuhrmann, et al., "Comprehensive Calibration and Registration Procedures for Augmented Reality", In Proceedings of the 7th Eurographics conference on Virtual Environments & 5th Immersive Projection Technology, May 16, 2001, 9 pages.

Nikolaus, "In-Depth Analysis: What's Inside HoloLens?", Retrieved on : Jul. 14, 2015 Available at: http://forums.windowscentral.com/microsoft-hololens/336812-depth-analysis-whats-inside-hololens.html.

Bruder, et al., "Estimation of Virtual Interpupillary Distances for Immersive Head-Mounted Displays", In Proceedings of the 7th Symposium on Applied Perception in Graphics and Visualization, Jul. 23, 2010, pp. 168.

Robinett, et al., "A Computational Model for the Stereoscopic Optics of a Head-Mounted Display", In Proceedings of the Stereoscopic Displays and Applications II, vol. 1457, Aug. 1, 1991, pp. 140-160.

Owen, et al., "Display Relative Calibration for Optical See-Through Head-Mounted Displays", In Third IEEE and ACM International Symposium on Mixed and Augmented Reality, Nov. 5, 2004, 9 pages.

Owen, et al., "Calibrating Head-Coupled Virtual Reality Systems", In a Thesis Submitted in Partial Fulfilment of the Requirements for the Degree of Master of Science in the Faculty of Graduate Studies, Apr. 2002, 106 pages.

\* cited by examiner

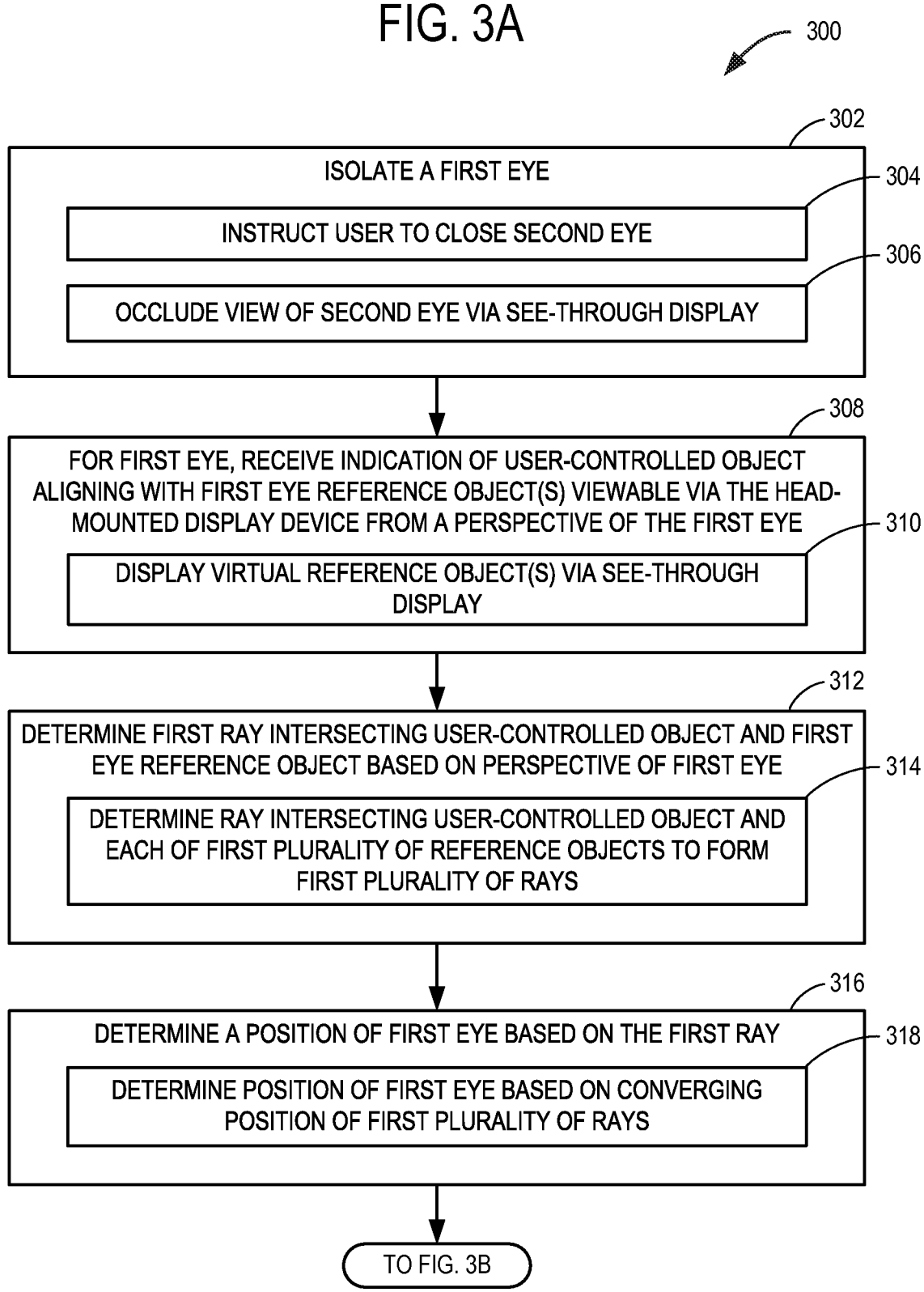

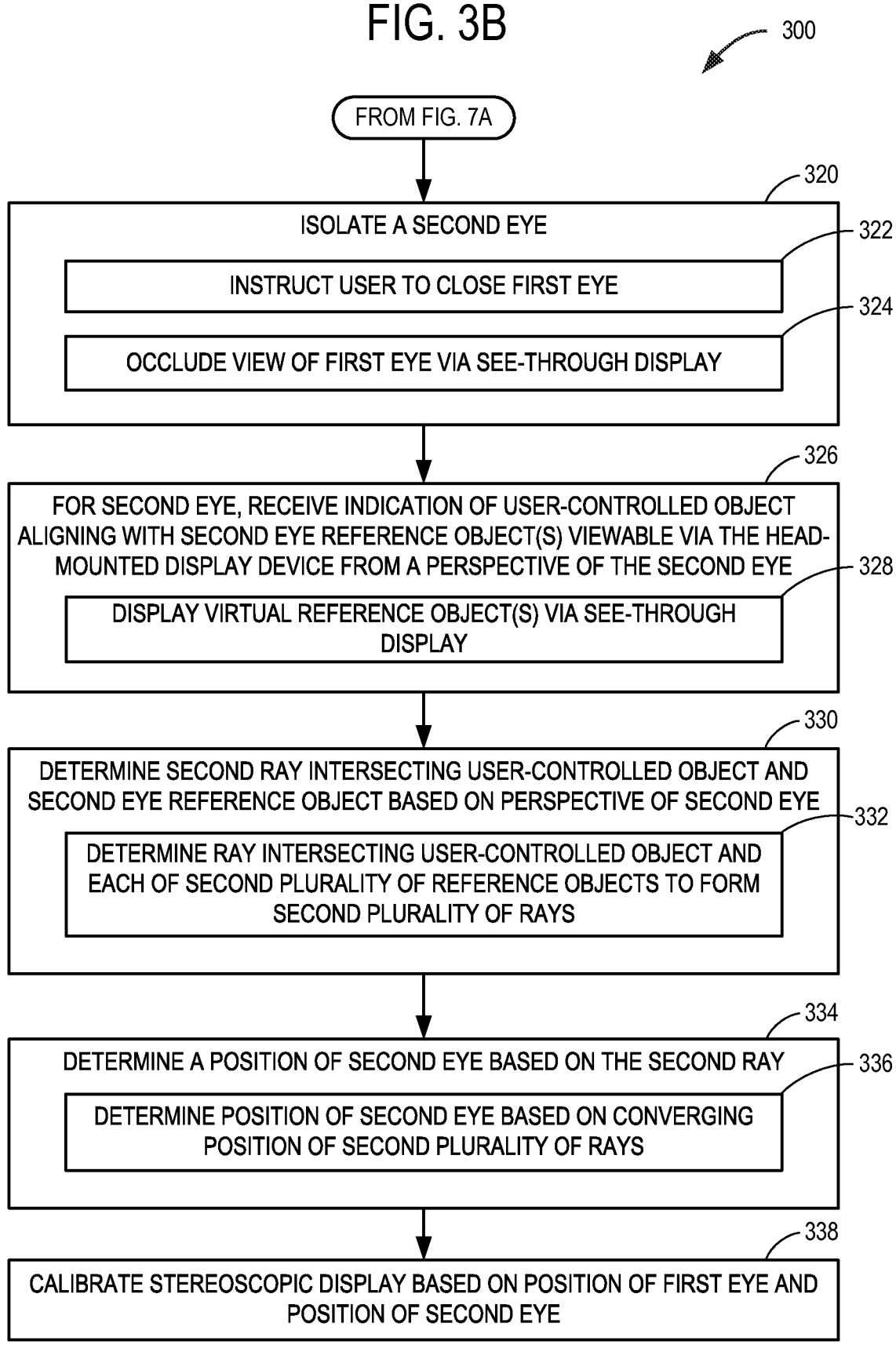

CALIBRATING A NEAR-EYE DISPLAY

BACKGROUND

Near-eye display technologies, such as head-mounted display devices, may allow a user to experience immersive virtual environments and/or a mix of real and virtual environments. For example, some near-eye display devices may utilize see-through displays that allow the presentation of augmented reality experiences by displaying virtual objects superimposed over a view of a real-world environment.

SUMMARY

Examples are disclosed herein that relate to calibrating a stereoscopic see-through display for a user's eyes. One example provides, on a head-mounted display device including a see-through display, a method including, for a first eye, receiving an indication of alignment of a user-controlled object with a first eye reference object viewable via the head-mounted display device from a perspective of the first eye, determining a first ray intersecting the user-controlled object and the first eye reference object from the perspective of the first eye, and determining a position of the first eye based on the first ray. The method further includes, for a second eye, receiving an indication of alignment of a user-controlled object with a second eye reference object viewable via the head-mounted display device from a perspective of the second eye, determining a position of the second eye based on the second ray, and calibrating the stereoscopic display based on the position of the first eye and the position of the second eye.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A and 3B show a flow diagram depicting an example method of calibrating a stereoscopic display for a head-mounted display device.

DETAILED DESCRIPTION

Head-mounted display devices may display virtual content via a near-eye display system by stereoscopically rendering virtual content for the point of view of each of a user's eyes, such that the user may perceive the content as a combined image from slightly different perspectives. The perspective for which each eye's image is rendered depends upon an estimated eye position of each eye of the user. If this estimated eye position is not sufficiently accurate, the display experience may be less realistic or enjoyable.

Accordingly, examples are disclosed herein that relate to estimating a user's eye positions for calibrating a stereoscopic near-eye display. Briefly, the disclosed examples determine a position for each of the user's eyes by receiving, separately for each eye, an indication of a user-controlled object aligning with a reference object viewable via a head-mounted display device, determining a ray that intersects the user-controlled object and the reference object, and determining a position of the eye based on the ray. Further, in some examples, a plurality of reference objects may be displayed at different positions to form a plurality of rays, and a location of convergence of the rays may be used to determine the eye position.

Figure 1:
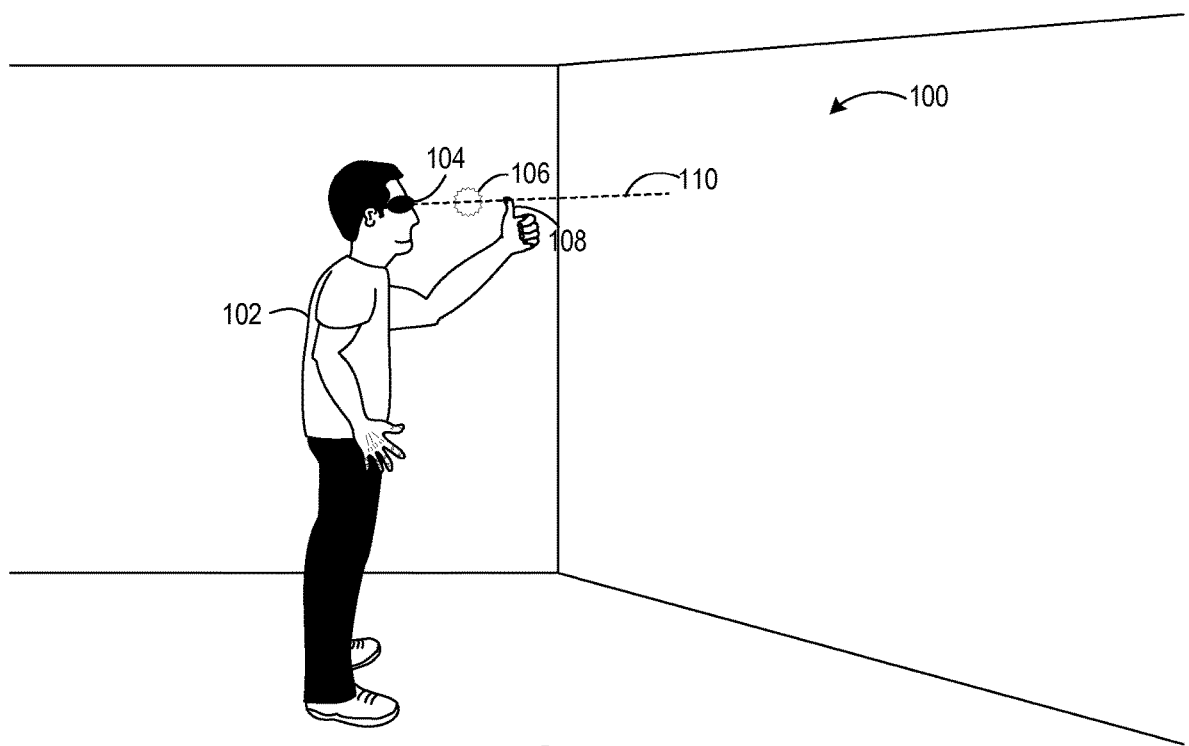
FIG. 1 illustrates an example eye position estimation performed via an example head-mounted display device.

FIG. 1 shows an example use scenario 100 in which a user 102 is wearing a head-mounted display device 104 and performing an eye-position calibration process. The head-mounted display device 104 is displaying a hologram 106 as a reference object for the user 102. It is noted that the hologram 106 is actually viewable to the user 102 through the head-mounted display device 104 and not from the perspective of FIG. 1, but is shown in the perspective of FIG. 1 to illustrate the calibration process more clearly. The user 102 is holding up a finger 108 such that the finger 108 appears to align with the hologram 106 from a perspective of a selected eye of the user 102. The other eye of the user is isolated, either by the user closing the other eye, or by the head-mounted display device 104 being controlled to occlude the view of the other eye. To determine alignment, the head-mounted display device 104 may detect, for example, whether the finger 108 is within a predetermined range of threshold distances from the hologram 106, and whether the finger 108 is being held in a sufficiently immobile manner. If both conditions are met, the head-mounted display device 104 may take measurement(s) to determine the position of the finger 108. As another example, the user 102 may indicate to the head-mounted display device 104 via a user input that the finger 108 is aligned with the hologram 106. Upon receiving confirmation of alignment, the head-mounted display device 104 may determine a ray intersecting hologram 106 and finger 108, and determine the estimated eye position via the ray, e.g. by a location at which the ray intersects an estimated plane passing through the eye.

The estimated eye position may include any suitable positional data. For example, in some implementations, the estimated eye position may be expressed simply as an x-position along an axis that extends between the eyes. In other implementations, the estimated eye position may also include a y-position (a distance along the axis orthogonal to the x-axis and parallel to the vertical axis of the user's head). Further, where multiple rays are used to perform the estimation, an estimated z-position of the eye (e.g. a distance along the axis orthogonal to the x- and y-axes away from the near-eye display) may be determined by a location of the convergence of the rays. Where a single ray is used to perform the estimation, the z position of the eye may be pre-set, or may be calibrated for the user in another manner.

The hologram 106 displayed as the reference object may have any suitable form. In FIG. 1, the hologram 106 takes the form of a ring, and the user 102 may position a tip of the finger 108 inside a center of the holographic ring as a condition of alignment. In other examples, the hologram may take the form of a line with which the user may align a finger, or other form. In yet other examples, the reference object may be a real-world object, instead of a displayed hologram. In such examples, the user 102 may align the finger 108 with the real-world object by occluding the real-world object with the finger 108 or other user-controlled object (e.g. a handheld object) from a perspective of the eye. Further, the head-mounted display device 104 may track a position of the real-world object relative to the position and orientation of the head-mounted display device 104, for example via image data acquired by image sensors and/or data acquired by other on-board sensors, such as an inertial measurement unit.

A user may confirm the alignment of the reference object to the user-controlled object via any suitable user input. For example, the user may input the indication of alignment via a mechanical actuator or touch sensor on the head-mounted display device 104, speech input, or body part gesture (e.g. hand motion or posture, verbal command, blinking of eye, etc.) as detectable via a suitable sensor on the head-mounted display device 104, such as an image sensor and/or inertial measurement unit.

The head-mounted display device 104 may include any suitable sensors for performing the eye position determination process. For example, the head-mounted display device 104 may include one or more outward-facing image sensors configured to acquire image data of the real-world background scene. Examples of such image sensors may include, but are not limited to, depth sensor systems (e.g. time-of-flight or structured light camera(s)), stereo camera systems, visible-light image sensors, and infrared image sensors. The head-mounted display device 104 may utilize image data from such image sensors to identify real-world objects, such as the finger 108 or other user-controlled objects, and/or real-world reference objects.

Figure 2:
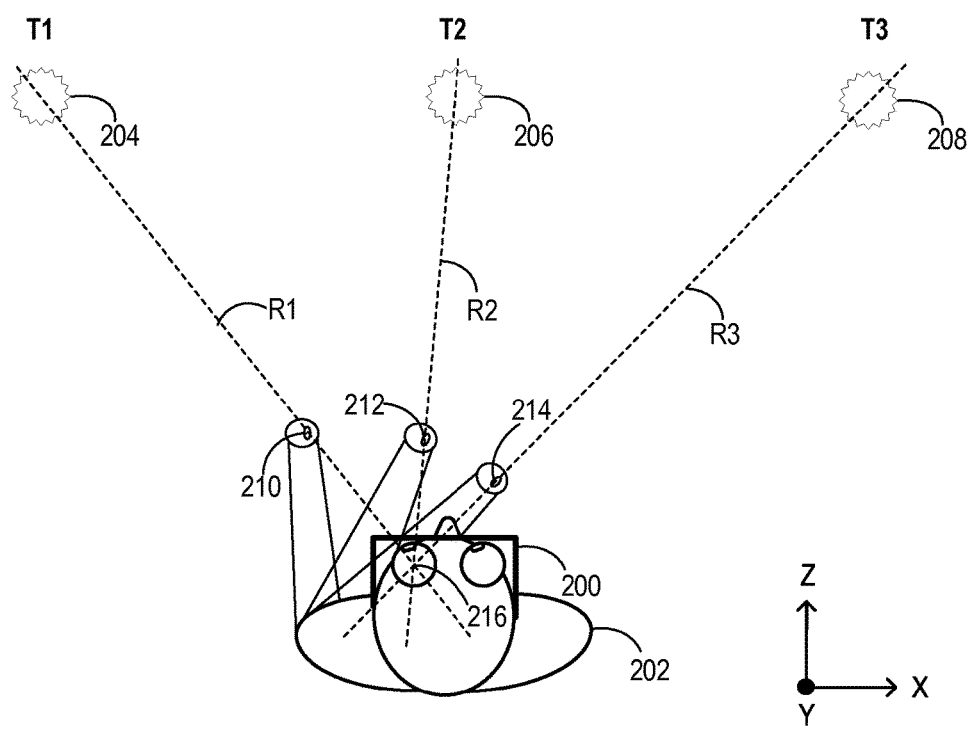
FIG. 2 illustrates another example of eye position estimation via a head-mounted display device.

As mentioned above, in some examples the head-mounted display device 104 may utilize a plurality of reference objects to determine a corresponding plurality of rays for each eye in a calibration process. The use of a plurality of rays may allow the position of the eye to be determined more accurately compared to the use of a single ray. FIG. 2 shows a schematic overhead view of a calibration process for a head-mounted display device 200 being worn by a user 202. Similar to the example of FIG. 1, the user 202 aligns, using the left eye, a user-controlled object (in this case the user's finger 210) with a first reference object 204. The user confirms the alignment at time T1, and the head-mounted display device 200 then determines a first ray R1 that intersects the first reference object 204 and the finger 210. Next, the user 202 moves the finger 210 to a second position to align the finger, again using the left eye, with a second reference object 206. The user confirms the alignment at time T2, and the head-mounted display device 200 determines a second ray R2 intersecting the second reference object 206 and the finger 212 at the second position. Similarly, the user next aligns finger 210 with a third reference object 208 from a perspective of the left eye, and confirms alignment at time T3. The head-mounted display device 200 then determines a third ray R3 intersecting the third reference object 208 and the finger 214.

After determining the rays, the head-mounted display device 200 may determine a position of the user's left eye based on a location of convergence 216 of the plurality of rays R1, R2, and R3. The location of convergence 216 may represent the center of rotation of the left eye, the optical center of the left eye, or other anatomical or optical feature of the eye. The location of convergence 216 may further be refined by applying pruning and/or averaging techniques to the plurality of rays and their intersections, such as a random sample consensus (RANSAC) technique or other suitable technique. The above steps may then be repeated for the user's right eye to determine a position of the right eye. It will be understood that the number of reference objects and rays shown in FIG. 2 is presented for the purpose of example, and that any suitable number of one or more rays/reference objects may be utilized to determine the position of each eye for stereoscopic display calibration.

FIG. 3 is a flow diagram illustrating an example method 300 of calibrating a stereoscopic display on a head-mounted display device. Method 300 includes, at 302, isolating a first eye so that the user can align a reference object with a user-controlled object via the isolated first eye. Any suitable method may be used to isolate the first eye. For example, the head-mounted display device may output instructions (e.g. via the see-through display device, via one or more speakers, or in any other suitable manner) to the user to perform alignment with the first eye and not a second eye. Alternatively, the first eye may be isolated by physically occluding a view of the second eye. For example, the head-mounted display device may output instructions to the user to close a second eye, as indicated at 304. As another example, the head-mounted display device may occlude a view of the second eye via the see-through display, at 306. It will be understood that physical occlusion of the second eye is optional and is not necessary to isolate the first eye, e.g. in the case where the user is simply instructed to perform the alignment from the perspective of the first eye.

Method 300 further includes, for the first eye, receiving an indication of a user-controlled object being aligned with a first eye reference object viewable via the head-mounted display device from a perspective of the first eye. Any suitable object may be utilized as the user-controlled object, such as a user body part (e.g. a finger, as described in regard to FIG. 1 and FIG. 2) or an object held by the user. Likewise, the first eye reference object may be a displayed virtual object or a physical object in the real-world background scene, as described above. In examples where a physical object is used as a reference object, the head-mounted display device may be configured to recognize and track the position of the physical object with respect to the position of the head-mounted display device. As mentioned above, a plurality of first eye reference objects may be displayed in some examples. In such examples, the user may sequentially indicate alignment of a user-controlled object with each first eye reference object.

Where the reference object is a real-world physical object viewable through the see-through display device, the reference object may be selected in any suitable manner. For example, a user may choose a reference object by pointing to the reference object, touching the reference object, etc., and the user indication may be detected via an outward-facing image sensor. As another example, the head-mounted display device may identify one or more suitable physical reference objects via image feature analysis, and then display virtual imagery to highlight a physical object to be used as the reference object. Examples of suitable physical reference objects include, but are not limited to, straight lines, corners, and other simple geometric features in the real-world background (e.g. where a wall meets a window, a frame of a door, an edge of a picture, a corner between two walls, etc.).

Once alignment has been achieved, the user may indicate the alignment via a user input. Where multiple reference objects are used, the user may perform the alignment sequentially for the multiple reference objects.

Continuing, method 300 further includes, at 312, determining a ray intersecting the user-controlled object and the first eye reference object based on a perspective of the first eye. Where multiple reference objects are used for the first eye, method 300 may include determining such a ray for each reference object, thereby forming a first plurality of rays, at 314. Once a ray has been determined for each reference object, method 300 may then include determining an estimated position of the first eye based on the first ray, at 316 (e.g. based upon where the first ray intersects an estimated plane that intersects the first eye), and/or based on a location of convergence of the first plurality of rays, at 318.

Continuing with FIG. 3B, method 300 further includes isolating a second eye, at 320. As described above, this may include instructing the user to close the first eye, at 322, and/or occluding a view of the first eye via the see-through display, at 324. Method 300 further includes, at 326, receiving an indication of the user-controlled object aligning with one or more second eye reference object(s) from a perspective of the second eye, wherein each reference object may be a physical object, or a displayed virtual object 328. Upon receiving indication of alignment, method 300 further includes, at 330, determining a ray intersecting the user-controlled object and the second eye reference object from a perspective of the second eye. Where a plurality of reference objects is sequentially aligned, this may include, at 332, determining an intersecting ray for each reference object to form a second plurality of rays. Method 300 then includes, at 334, determining an estimated position of the second eye based upon the ray. Where multiple rays are used, the estimated position may be based on a location of convergence of the second plurality of rays, as indicated at 336.

Once the estimated positions for the first and second eyes have been determined, method 300 includes calibrating a stereoscopic display based on the determined position of the first eye and the position of the second eye, at 338. As a non-limiting example, the head-mounted display device may calculate an interpupillary distance based on the positions of the first eye and the second eye. Such calibration may help the head-mounted display device to appropriately render stereoscopic imagery for the wearer.

Figure 4:
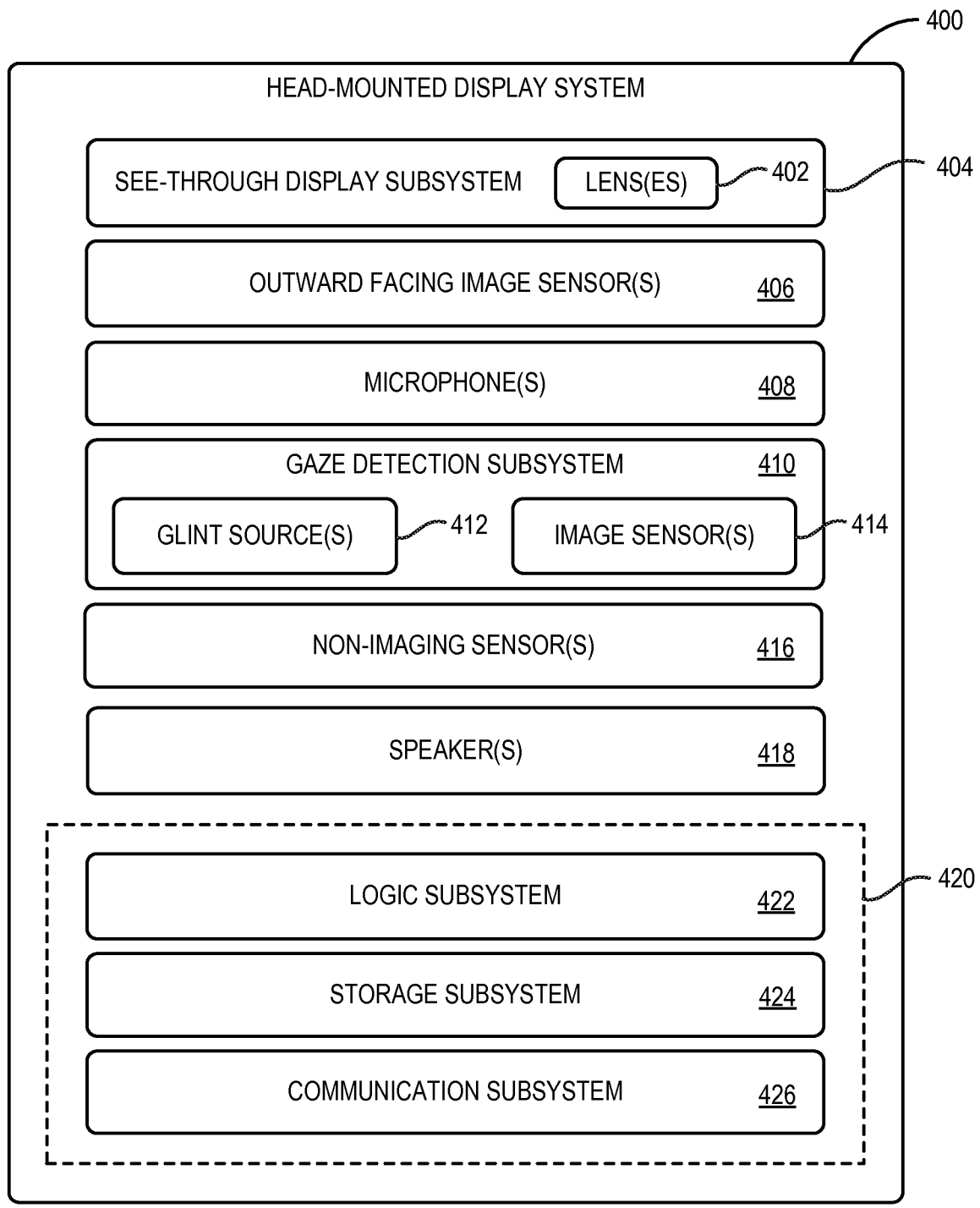
FIG. 4 shows a block diagram of an example augmented reality display system.

The examples described above may be implemented via any suitable device. FIG. 4 shows a block diagram of an example head-mounted display system 400. The display system 400 includes one or more lenses 402 that form a part of a see-through display subsystem 404, such that images may be displayed via lenses 402 (e.g. via projection onto lenses 402, waveguide system(s) incorporated into lenses 402, and/or in any other suitable manner). The display system 400 further includes one or more outward-facing image sensors 406 configured to acquire images of a real-world environment being viewed by a user, and may include one or more microphones 408 configured to detect sounds, such as voice commands from a user or ambient sounds. The outward-facing image sensors 406 may include one or more depth sensor(s) and/or one or more two-dimensional image sensor(s) (e.g. RGB image sensors and/or infrared image sensors). In other examples, the head-mounted display system 400 may display augmented reality images via a viewfinder mode for an outward-facing image sensor, rather than via a see-through display subsystem.

The display system 400 may further include a gaze detection subsystem 410 configured to detect a gaze of a user. The gaze detection subsystem 410 may be configured to determine gaze directions of each of a user's eyes in any suitable manner. For example, in the depicted embodiment, the gaze detection subsystem 410 comprises one or more glint sources 412, such as infrared light sources configured to cause a glint of light to reflect from each eyeball of a user, and one or more image sensor(s) 414, such as inward-facing sensors, configured to capture an image of each eyeball of the user. Changes in the glints from the user's eyeballs and/or a location of a user's pupil as determined from image data gathered via the image sensor(s) 414 may be used to determine a direction of gaze. Further, a location at which gaze lines projected from the user's eyes may be used to determine an object at which the user is gazing (e.g. a displayed virtual object and/or real-world object). The gaze detection subsystem 410 may have any suitable number and arrangement of light sources and image sensors. In other examples, the gaze detection subsystem 410 may use any other suitable gaze tracking technology, or may be omitted.

The display system 400 also may include additional sensors, as mentioned above. For example, the display system 400 may include non-imaging sensor(s) 416, examples of which may include but are not limited to an accelerometer, a gyroscopic sensor, a global positioning system (GPS) sensor, and an inertial measurement unit (IMU). Such sensor(s) may help to determine the position, location, and/or orientation of the display device within the environment, which may help provide accurate 3D mapping of the real-world environment for use in displaying image data appropriately in an augmented reality setting.

Motion sensors, as well as microphone(s) 408 and the gaze detection subsystem 410, also may be employed as user input devices, such that a user may interact with the display system 400 via gestures of the eye, neck and/or head, as well as via verbal commands. It will be understood that the sensors illustrated in FIG. 4 are shown for the purpose of example and are not intended to be limiting in any manner, as any other suitable sensors and/or combination of sensors may be utilized.

The display system 400 further includes one or more speaker(s) 418, for example to provide audio outputs to a user for user interactions. The display system 400 further includes a controller 420 having a logic subsystem 422 and a storage subsystem 424 in communication with the sensors, the gaze detection subsystem 410, the see-through display subsystem 404, and/or other components. The storage subsystem 424 comprises instructions stored thereon that are executable by the logic subsystem 422, for example, to display reference objects in an eye position calibration process, to receive and interpret inputs from the sensors, to identify real objects in an augmented reality field of view (e.g. reference object(s) or a user-controlled object), to determine one or more ray(s) intersecting the user-controlled object and each reference object based on a perspective of each eye, to determine a position of each eye, and to calibrate a stereoscopic display based on the position of each eye, among other tasks.

The logic subsystem 422 includes one or more physical devices configured to execute instructions. For example, the logic subsystem 422 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 422 may include one or more processors configured to execute software instructions. Additionally or alternatively, the logic subsystem 422 may include one or more hardware or firmware logic subsystems configured to execute hardware or firmware instructions. Processors of the logic subsystem 422 may be single-core or multi-core, and the instructions executed thereon may be configured for sequential, parallel, and/or distributed processing. Individual components of the logic subsystem 422 optionally may be distributed among two or more separate devices, which may be remotely located and/or configured for coordinated processing. Aspects of the logic subsystem 422 may be virtualized and executed by remotely accessible, networked computing devices configured in a cloud-computing configuration.

The storage subsystem 424 includes one or more physical devices configured to hold instructions executable by the logic subsystem 422 to implement the methods and processes described herein. When such methods and processes are implemented, the state of the storage subsystem 424 may be transformed—e.g., to hold different data.

The storage subsystem 424 may include removable and/or built-in devices. The storage subsystem 424 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem 424 may include volatile, nonvolatile, dynamic, static, read/write, read-only, random-access, sequential-access, location-addressable, file-addressable, and/or content-addressable devices.

It will be appreciated that the storage subsystem 424 includes one or more physical devices. However, aspects of the instructions described herein may be propagated by a communication medium (e.g., an electromagnetic signal, an optical signal, etc.) that is not held by a physical device for a finite duration.

Aspects of the logic subsystem 422 and the storage subsystem 424 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The see-through display subsystem 404 may be used to present a visual representation of data held by the storage subsystem 424. This visual representation may take the form of a graphical user interface (GUI) comprising volumetric image data. As the herein described methods and processes change the data held by the storage subsystem, and thus transform the state of the storage subsystem, the state of the see-through display subsystem 404 may likewise be transformed to visually represent changes in the underlying data. The see-through display subsystem 404 may include one or more display devices utilizing virtually any type of technology. Such display devices may be combined with the logic subsystem 422 and/or the storage subsystem 424 in a shared enclosure, or such display devices may be peripheral display devices.

The communication subsystem 426 may be configured to communicatively couple the display system 400 with one or more other computing devices. The communication subsystem 426 may include wired and/or wireless communication devices compatible with one or more different communication protocols. As non-limiting examples, the communication subsystem 426 may be configured for communication via a wireless telephone network, or a wired or wireless local- or wide-area network. In some embodiments, the communication subsystem 426 may allow the display system 400 to send and/or receive messages to and/or from other devices via a network such as the Internet.

It will be appreciated that the depicted display system 400 is described for the purpose of example, and thus is not meant to be limiting. It is to be further understood that the display system may include additional and/or alternative sensors, cameras, microphones, input devices, output devices, etc. than those shown without departing from the scope of this disclosure. For example, the display system 400 may be implemented as a virtual realty display system rather than an augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on the display system 400 or other suitable display system, or may be executable remotely on a computing system in communication with the display system 400.

Another example provides, on a head-mounted display device comprising a see-through display, a method of calibrating a stereoscopic display for a user's eyes, the method comprising, for a first eye, receiving an indication of alignment of a user-controlled object with a first eye reference object viewable via the head-mounted display device from a perspective of the first eye, determining a first ray intersecting the user-controlled object and the first eye reference object from the perspective of the first eye, and determining a position of the first eye based on the first ray, and for a second eye, receiving an indication of alignment of a user-controlled object with a second eye reference object viewable via the head-mounted display device from a perspective of the second eye, determining a second ray intersecting the user-controlled object and the second eye reference object from the perspective of the second eye, and determining a position of the second eye based on the second ray, and calibrating the stereoscopic display based on the position of the first eye and the position of the second eye. The position of the first eye and the position of the second eye each may additionally or alternatively include one or more of an x-position, a y-position, and a z-position. The user-controlled object may additionally or alternatively include a body part of the user. One or more of the first eye reference object and the second eye reference object may additionally or alternatively include a hologram displayed via the see-through display. One or more of the first eye reference object and the second eye reference object may additionally or alternatively include a real-world object. The method may additionally or alternatively include receiving an additional indication of alignment of a user-controlled object aligning with an additional reference object for the first eye, determining an additional ray intersecting the user-controlled object and the additional reference object to form a plurality of rays from the perspective of the first eye, and determining the position of the first eye based on a location of convergence of the plurality of rays. The method may additionally or alternatively include isolating each of the first eye and the second eye by instructing the user to close the other of the first eye and the second eye. The method may additionally or alternatively include isolating each of the first eye and the second eye by occluding a view of the other of the first eye and the second eye via the see-through display.

Another example provides a head-mounted display device, comprising a depth image sensor, a see-through display configured to display virtual content and through which a real-world background scene is viewable, a logic subsystem, and a storage subsystem comprising instructions executable by the logic subsystem to, for a first eye, for each reference object of a first plurality of reference objects viewable via the head-mounted display device, receive an indication of alignment of a user-controlled object with the reference object, and determine a ray intersecting the user-controlled object and the reference object, to form a first plurality of rays based on a perspective of the first eye, estimate a location of convergence of the first plurality of rays, and determine a position of the first eye based on the location of convergence of the first plurality of rays, for a second eye, for each reference object of a second plurality of reference objects viewable via the head-mounted display device, receive an indication of alignment of a user-controlled object with the reference object, and determine a ray intersecting the user-controlled object and the reference object to form a second plurality of rays based on a perspective of the second eye, estimate a location of convergence of the second plurality of rays, and determine a position of the second eye based on the location of convergence of the second plurality of rays, and calibrate the stereoscopic display for the user's eyes based on the position of the first eye and the position of the second eye. The position of the first eye and the position of the second eye each may additionally or alternatively include one or more of an x-position, a y-position, and a z-position. The user-controlled object may additionally or alternatively include a body part of the user. One or more of the first plurality of reference objects and the second plurality of reference objects may additionally or alternatively include a hologram displayed via the see-through display. The instructions may additionally or alternatively be executable to display each hologram of the first plurality of reference objects sequentially and each hologram of the second plurality of reference objects sequentially. One or more of the first plurality of reference objects and the second plurality of reference objects may additionally or alternatively include a real-world object. The instructions may additionally or alternatively be executable to isolate each of the first eye and the second eye by occluding a view of the other of the first eye and the second eye via the see-through display.

Another example provides a head-mounted display device, comprising a depth image sensor, a see-through display configured to display virtual content and through which a real-world background scene is viewable, a logic subsystem, and a storage subsystem comprising instructions executable by the logic subsystem to, for a first eye, sequentially display a first plurality of holograms via the see-through display, for each hologram of the first plurality of holograms, receive an indication of alignment of a user-controlled object with the hologram, and determine a ray intersecting the user-controlled object and the hologram to form a first set of rays based on a perspective of the first eye, estimate a location of convergence of the first set of rays, and determine a position of the first eye based on the location of convergence of the first set of rays, for a second eye, sequentially display a second plurality of holograms via the see-through display, for each hologram of the second plurality of holograms, receive an indication of alignment of a user-controlled object with the hologram, and determine a ray intersecting the user-controlled object and the hologram to form a second set of rays based on a perspective of the second eye, estimate a location of convergence of the second set of rays, and determine a position of the second eye based on the location of convergence of the second set of rays, and calibrate the stereoscopic display for the user's eyes based on the position of the first eye and the position of the second eye. The position of the first eye and the position of the second eye each may additionally or alternatively include one or more of an x-position, a y-position, and a z-position. The user-controlled object may additionally or alternatively include a finger of the user. The instructions may addition-ally or alternatively be executable to display each hologram by displaying a ring, and detect the finger aligning with the hologram by detecting a tip of the finger positioned within the ring. The instructions may additionally or alternatively be executable to calibrate the stereoscopic display via an interpupillary distance based on the position of the first eye and the position of the second eye.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a head-mounted display device comprising a see-through stereoscopic display and memory storing instructions executable by a logic subsystem, a method of calibrating the see-through stereoscopic display for a user's eyes, the method comprising:

for a first eye,
receiving first eye image data from one or more image sensors, the first eye image data comprising an image of a user-controlled object for the first eye, the user-controlled object for the first eye comprising a body part of the user or an object held by the user,
receiving a user input indicating an alignment of the user-controlled object for the first eye with a first eye reference object viewable via the head-mounted display device from a perspective of the first eye,
determining via the first eye image data a first ray intersecting the user-controlled object for the first eye and the first eye reference object from the perspective of the first eye, and
determining a position of the first eye based on a location at which the first ray intersects a plane passing through the first eye;

separately, for a second eye,
receiving second eye image data from the one or more image sensors, the second eye image data comprising an image of a user-controlled object for the second eye, the user-controlled object for the second eye comprising the body part of the user, another body part of the user, or the object held by the user,
receiving a user input indicating an alignment of the user-controlled object for the second eye with a second eye reference object viewable via the head-mounted display device from a perspective of the second eye,
determining via the second eye image data a second ray intersecting the user-controlled object for the second eye and the second eye reference object from the perspective of the second eye, and
determining a position of the second eye based on a location at which the second ray intersects a plane passing through the second eye;

calibrating the see-through stereoscopic display based on the position determined for the first eye and the position determined for the second eye; and displaying a stereoscopic image comprising a first eye image and a second eye image based on calibrating.

2. The method of claim 1, wherein the position determined for the first eye and the position determined for the second eye each comprises an x-position, a y-position, and a z-position.

3. The method of claim 1, wherein the user-controlled object for the first eye and the user-controlled object for the second eye each comprises a finger of the user.

4. The method of claim 1, wherein one or more of the first eye reference object and the second eye reference object comprises a hologram displayed via the see-through stereoscopic display.

5. The method of claim 1, wherein one or more of the first eye reference object and the second eye reference object comprises a real-world object.

6. The method of claim 1, further comprising,
receiving an additional user input indicating an alignment of a user-controlled object with an additional reference object for the first eye,
determining an additional ray intersecting the user-controlled object and the additional reference object to form a plurality of rays from the perspective of the first eye, and
determining the position of the first eye based on a location of convergence of the plurality of rays.

7. The method of claim 1, further comprising isolating each of the first eye and the second eye by instructing the user to close the other of the first eye and the second eye.

8. The method of claim 1, further comprising isolating each of the first eye and the second eye by occluding a view of the other of the first eye and the second eye via the see-through stereoscopic display.

9. A head-mounted display device, comprising:
a depth image sensor;
a see-through stereoscopic display configured to display virtual content and through which a real-world background scene is viewable;
a logic subsystem; and
a storage subsystem comprising instructions executable by the logic subsystem to,
for a first eye,
receive first eye image data from the depth image sensor, the first eye image data comprising an image of a user-controlled object for the first eye, the user-controlled object for the first eye comprising a body part of the user or an object held by the user,
for each reference object of a first plurality of reference objects viewable via the head-mounted display device, receive a user input indicating an alignment of the user-controlled object for the first eye with the reference object, and determine a ray intersecting the user-controlled object for the first eye and the reference object, to form a first plurality of rays based on a perspective of the first eye,
estimate a location of convergence of the first plurality of rays, and
determine a position of the first eye based on the location of convergence of the first plurality of rays;
separately, for a second eye,
receive second eye image data from the depth image sensor, the second eye image data comprising an image of a user-controlled object for the second eye, the user-controlled object for the second eye comprising the body part of the user, another body part of the user, or the object held by the user,
for each reference object of a second plurality of reference objects viewable via the head-mounted display device, receive a user input indicating an alignment of the user-controlled object for the second eye with the reference object, and determine a ray intersecting the user-controlled object for the second eye and the reference object to form a second plurality of rays based on a perspective of the second eye,
estimate a location of convergence of the second plurality of rays, and
determine a position of the second eye based on the location of convergence of the second plurality of rays;
calibrate the see-through stereoscopic display for the user's eyes based on the position determined for the first eye and the position determined for the second eye; and
display a stereoscopic image comprising a first eye image and a second eye image based on calibrating the see-through stereoscopic display.

10. The head-mounted display device of claim 9, wherein the position determined for the first eye and the position determined for the second eye each comprises an x-position, a y-position, and a z-position.

11. The head-mounted display device of claim 9, wherein the user-controlled object for the first eye and the user-controlled object for the second eye each comprises a finger of the user.

12. The head-mounted display device of claim 9, wherein one or more of the first plurality of reference objects and the second plurality of reference objects comprises a hologram displayed via the see-through stereoscopic display.

13. The head-mounted display device of claim 12, wherein the instructions are executable to display each hologram of the first plurality of reference objects sequentially and each hologram of the second plurality of reference objects sequentially.

14. The head-mounted display device of claim 9, wherein one or more of the first plurality of reference objects and the second plurality of reference objects comprises a real-world object.

15. The head-mounted display device of claim 9, wherein the instructions are executable to isolate each of the first eye and the second eye by occluding a view of the other of the first eye and the second eye via the see-through stereoscopic display.

16. A head-mounted display device, comprising:
a depth image sensor;
a see-through stereoscopic display configured to display virtual content and through which a real-world background scene is viewable;
a logic subsystem; and
a storage subsystem comprising instructions executable by the logic subsystem to
for a first eye,
sequentially display a first plurality of holograms via the see-through display,
receive first eye image data from the depth image sensor, the first eye image data comprising an image of a user-controlled object for the first eye, the user-controlled object for the first eye comprising a body part of the user or an object held by the user,
for each hologram of the first plurality of holograms, receive a user input indicating an alignment of the user-controlled object for the first eye with the hologram, and determine a ray intersecting the user-controlled object for the first eye and the hologram to form a first set of rays based on a perspective of the first eye,
estimate a location of convergence of the first set of rays, and
determine a position of the first eye based on the location of convergence of the first set of rays;
separately, for a second eye,
sequentially display a second plurality of holograms via the see-through display,
receive second eye image data from the depth image sensor, the second eye image data comprising an image of a user-controlled object for the second eye, the user-controlled object for the second eye comprising the body part of the user, another body part of the user, or the object held by the user,
for each hologram of the second plurality of holograms, receive a user input indicating an alignment of the user-controlled object for the second eye with the hologram, and determine a ray intersecting the user-controlled object for the second eye and the hologram to form a second set of rays based on a perspective of the second eye,
estimate a location of convergence of the second set of rays, and
determine a position of the second eye based on the location of convergence of the second set of rays;
calibrate the see-through stereoscopic display for the user's eyes based on the position determined for the first eye and the position determined for the second eye; and
display a stereoscopic image comprising a first eye image and a second eye image based on calibrating the see-through stereoscopic display.

17. The head-mounted display device of claim 16, wherein the position determined for the first eye and the position determined for the second eye each comprises one or more of an x-position, a y-position, and a z-position.

18. The head-mounted display device of claim 16, wherein the user-controlled object for the first eye and the user-controlled object for the second eye each comprises a finger of the user.

19. The head-mounted display device of claim 18, wherein the instructions are executable to display each hologram by displaying a ring, and detect the finger aligning with the hologram by detecting a tip of the finger positioned within the ring.

20. The head-mounted display device of claim 16, wherein the instructions are executable to calibrate the see-through stereoscopic display via an interpupillary distance based on the position determined for the first eye and the position determined for the second eye.

* * * * *